United States Patent
Gandhi et al.

(10) Patent No.: US 7,181,392 B2
(45) Date of Patent: Feb. 20, 2007

(54) DETERMINING SPEECH RECOGNITION ACCURACY

(75) Inventors: Shailesh B. Gandhi, Boca Raton, FL (US); Peeyush Jaiswal, Boca Raton, FL (US); Victor S. Moore, Boynton Beach, FL (US); Gregory L. Toon, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 968 days.

(21) Appl. No.: 10/196,014

(22) Filed: Jul. 16, 2002

(65) Prior Publication Data

US 2004/0015350 A1  Jan. 22, 2004

(51) Int. Cl.
  *G10L 15/26* (2006.01)
  *G10L 21/00* (2006.01)

(52) U.S. Cl. ........................... 704/235; 704/270
(58) Field of Classification Search ............... None
  See application file for complete search history.

(56) References Cited

U.S. PATENT DOCUMENTS

| | | | |
|---|---|---|---|
| 4,718,094 A | 1/1988 | Bahl et al. ............. 381/43 |
| 5,754,978 A * | 5/1998 | Perez-Mendez et al. .... 704/255 |
| 5,870,709 A | 2/1999 | Bernstein ............. 704/275 |
| 5,899,973 A | 5/1999 | Bandara et al. ......... 704/256 |
| 5,946,656 A | 8/1999 | Rahim et al. ........... 704/256 |
| 5,970,446 A | 10/1999 | Goldberg et al. ........ 704/233 |
| 6,014,624 A | 1/2000 | Raman ................. 704/243 |
| 6,088,669 A | 7/2000 | Maes .................. 704/231 |
| 6,122,613 A * | 9/2000 | Baker ................. 704/235 |
| 7,016,829 B2 * | 3/2006 | Brill et al. ........... 704/9 |
| 2003/0004724 A1 * | 1/2003 | Kahn et al. ........... 704/260 |
| 2003/0040907 A1 * | 2/2003 | Chang et al. .......... 704/231 |
| 2004/0128143 A1 * | 7/2004 | Kahn et al. ........... 704/277 |

FOREIGN PATENT DOCUMENTS

WO   WO 00/43988   7/2000

OTHER PUBLICATIONS

E.R. Buhrke, et al., *Application of Vector Quantized Hidden Markov Modeling To Telephone Network Based Connected Digit Recognition*, 1994 IEEE Int'l. Conf. on Acoustics, Speech and Signal Processing, (Apr. 19-22, 1994).
J. Liu, et al., *A New Robust Telephone Speech Recognition Algorithm With The Multi-Model Structures*, Chinese Journal of Electronics, vol. 9, No. 2, (Apr. 2000).
*Business Method For Phone Message Access Over The Web*, IBM Research Disclosure, Art. 194, (Apr. 2001).
J. W. Cooper, et al., *SAMSA: A Speech Analysis, Mining and Summary Application For Outbound Telephone Calls*, Proc. of 34th Annual Hawaii Int'l. Conf. on System Sciences, (2001).

* cited by examiner

Primary Examiner—David Hudspeth
Assistant Examiner—Matthew J. Sked
(74) Attorney, Agent, or Firm—Akerman Senterfitt

(57) ABSTRACT

A method of determining the accuracy of a speech recognition system can include identifying from a log of the speech recognition system a text result and attributes associated with the text result. An audio representation from which the text result was derived can be accessed. The audio representation can be processed with a reference speech recognition engine to determine a second text result. The text result can be compared with the second text result to determine an accuracy of the speech recognition system.

22 Claims, 4 Drawing Sheets

| Manual Listen | Application Voice Server 1 | Result 1 | Application Voice Server 2 | Result 2 |
|---|---|---|---|---|
| Last requested route | LAST REQUESTED ROUTE | OK | LAST REQUESTED ROUTE | OK |
| yes | YES | OK | YEAH | OK |
| go to step six | GO TO STEP eighteen | FAIL | GO TO SLEEP | FAIL |
| go to step seven | GO TO STEP seven | OK | GO TO STEP eleven | FAIL |
| N/A | [spoke too soon] | N/A | [ ] | N/A |
| last requested route | [timeout] | FAIL | LAST REQUESTED ROUTE | OK |
| go to step eight | [silence] | FAIL | GO TO STEP EIGHT | OK |

FIG. 3

| What was said | Total Count | OK Count | Fail Count | N/A Count |
|---|---|---|---|---|
| Last requested route | 7 | 6 | 1 | 0 |
| yes | 27 | 21 | 6 | 0 |
| go to step six | 1 | 0 | 1 | 0 |
| go to step seven | 2 | 2 | 0 | 0 |
| N/A | 4 | 0 | 0 | 4 |
| go to step eight | 1 | 0 | 1 | 0 |

DETERMINING SPEECH RECOGNITION ACCURACY

BACKGROUND OF THE INVENTION

1. Technical Field

This invention relates to the field of speech recognition, and more particularly, to determining the accuracy of a speech recognition system.

2. Description of the Related Art

Speech recognition is the process by which an acoustic signal received by microphone is converted to a set of text words, numbers, or symbols by a computer or a microprocessor based device. These recognized words may be used in a variety of computer-based software applications for purposes such as document preparation, data entry, and command and control. Improvements to speech recognition systems provide an important way to enhance user productivity.

Speech recognition systems can model and classify acoustic signals to form acoustic models, which are representations of basic linguistic units referred to as phonemes. Upon receiving and digitizing an acoustic speech signal, the speech recognition system can analyze the digitized speech signal, identify a series of acoustic models corresponding to the speech signal, and derive a list of potential word candidates based upon the identified series of acoustic models. The speech recognition system also can determine a measurement reflecting the degree to which the potential word candidates phonetically match the digitized speech signal.

Speech recognition systems further can analyze the potential word candidates with reference to a contextual model. This analysis can determine a probability that one of the word candidates accurately reflects received speech based upon previously recognized words. The speech recognition system can factor subsequently received words into the probability determination as well. The contextual model, often referred to as a language model, can be developed through an analysis of many hours of human speech. Typically, the development of a language model can be domain specific. For example, a language model can be built reflecting language usage within a telephony context, a legal context, a medical context, or for a general user context.

The accuracy of speech recognition systems can be dependent on a number of factors. One such factor can be the audio environment in which speech is detected. The audio environment can significantly affect the resulting quality of the speech audio signal. User speech obtained from high noise environments, for example automobiles or public places such as where one communicates with a speech recognition system using a public telephone, can include a significant amount of environmental noise. This can lead to poor speech recognition. Further, telephony systems often utilize low quality audio signals to represent speech. The use of low quality audio signals within a voice processing system can exacerbate the aforementioned problem as a low quality audio channel may result in noise which overpowers the user speech.

Another factor that can significantly affect the accuracy of a speech recognition system is the configuration of the speech recognition system itself. System configuration can be particularly relevant with regard to speech recognition systems which operate in diverse audio environments and/or audio environments having a significant amount of noise.

SUMMARY OF THE INVENTION

The invention disclosed herein provides a solution for determining the accuracy of a speech recognition system. According to the present invention, a speech recognition system transaction log can be examined in addition to the audio segments associated with the transaction log. The audio can be processed by a second and different speech recognition system or engine. Although text can be determined from the audio segments in a manual fashion so as to provide for an added measure of error checking, the output of the two speech recognition systems can be compared to determine a variety of statistical accuracy metrics. Notably, the results from both speech recognition systems can be compared with the manually determined text.

The manual text determination provides an opportunity to inspect or listen to the audio recordings or audio segments of user responses. Accordingly, comments and notations regarding the various environmental factors as well as the audio quality of the audio recording can be recorded for purposes of evaluating the accuracy of the speech recognition system. The present invention enables personnel to better determine causes of speech recognition errors such as improper speech recognition system configuration, user error, or poor audio quality.

One aspect of the present invention can include a method of determining the accuracy of a speech recognition system. The method can include identifying from a log of the speech recognition system a text result and attributes associated with the text result. An audio representation from which the text result was derived can be accessed. For example, the attributes can specify timing information for the text result such that the accessing step can include identifying the audio representation from one or more audio representations according to the attributes of the text result. The audio representation can be processed with a reference speech recognition engine to determine a second text result. The text result can be compared with the second text result to determine an accuracy of the speech recognition system.

The steps of identifying a text result and associated attributes, accessing the audio representation, processing the audio representation with a reference system, and comparing the first and second text results can be repeated for additional text results of the speech recognition system to determine an accuracy statistic of the speech recognition system. Notably, one or more error conditions also can be identified from the log such that the accuracy statistic can be determined for one or more of the identified error conditions.

For example, accuracy statistics can include a ratio of successful recognitions to total recognitions, a ratio of successful recognitions to total recognitions minus failed recognitions, and a ratio of failed recognitions to total recognitions. Other accuracy statistics can include a ratio of failed recognitions to total recognitions minus failed recognitions due to uncontrollable environmental elements, and a ratio of failed recognitions due to uncontrollable environmental elements to total recognitions. Still, other examples of accuracy statistics can include a total number of occurrences of unique words in which there was an attempt at recognition, a number of the occurrences of unique words which were successfully recognized, a number of the occurrences of unique words which were unsuccessfully recognized, and a number of failed recognition attempts for the occurrences of unique words due to uncontrollable environmental elements.

According to another aspect of the invention, the method can include the steps of manually determining text from the audio representation, and comparing the first text result and the second text result with the manually determined text. Additionally, audio properties of the audio representation can be received. The configuration of the reference speech recognition engine can be modified according to the audio properties of the audio representation. Similarly, the acoustic models of the reference speech recognition engine can be altered according to the audio properties of the audio representation.

BRIEF DESCRIPTION OF THE DRAWINGS

There are shown in the drawings embodiments which are presently preferred, it being understood, however, that the invention is not limited to the precise arrangements and instrumentalities shown.

FIG. 3 is a table illustrating sample data which can be compiled by the system of FIG. 2 in accordance with the inventive arrangements disclosed herein.

FIG. 4 is a table illustrating sample statistical metric calculations as determined in accordance with the inventive arrangements disclosed herein.

DETAILED DESCRIPTION OF THE INVENTION

The invention disclosed herein provides a solution for determining the accuracy of a speech recognition system. According to the present invention, a speech recognition system transaction log can be examined in addition to the audio segments associated with the transaction log. The audio can be processed by a second speech recognition system to determine a second set of recognition results from the recorded audio segments. Accordingly, the output of the two speech recognition systems can be compared to determine a variety of statistical accuracy metrics.

Figure 1:
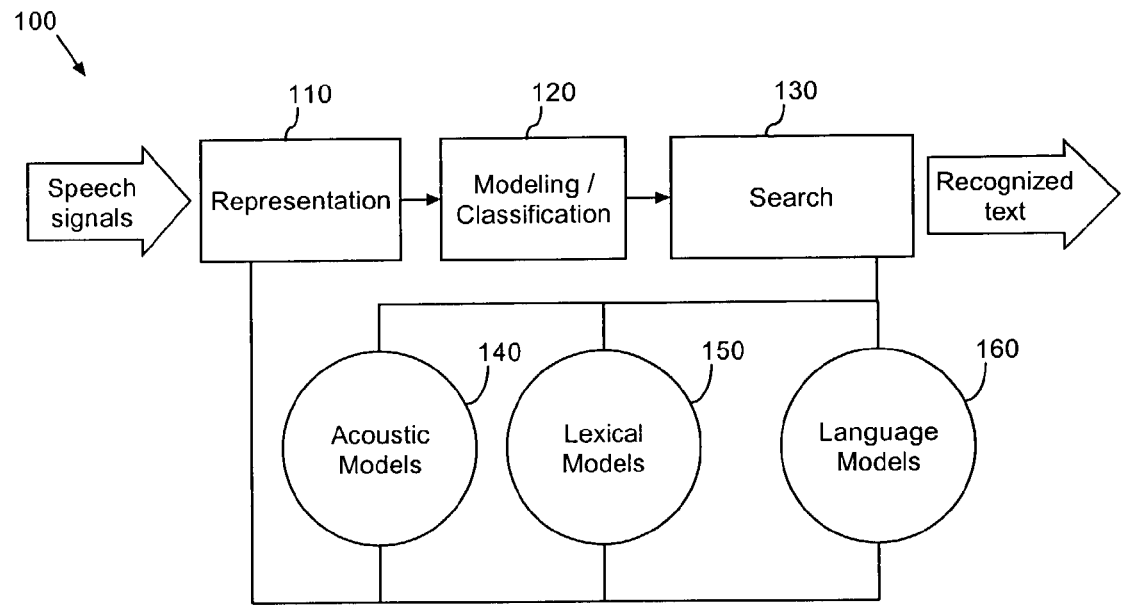
FIG. 1 is a block diagram showing typical components which can be included within a speech recognition engine.

FIG. 1 is a block diagram showing typical components of a speech recognition engine 100 of a speech recognition system. Those skilled in the art will recognize that a speech recognition system can include one or more other applications (not shown) configured to interact with the speech recognition engine 100. For example, the applications can provide graphical interfaces for editing recognized text, generate dialogs with users, or answer and manage telephone calls from users. In any case, the speech recognition engine 100 can be included within a desktop speech recognition system, an interactive voice response (IVR) unit, or a distributed computing environment.

As shown in FIG. 1, the speech recognition engine 100 receives a digitized speech signal. The signal can be subsequently transformed in representation block 110 into a useful set of data by sampling the signal at some fixed rate, typically every 10–20 msec. The representation block 110 can be configured to produce a new representation of the audio signal which can be used in subsequent stages of the voice recognition process to determine the probability that the portion of the waveform just analyzed corresponds to a particular phonetic event. This process is intended to emphasize perceptually important speaker independent features of the speech signals received from the operating system. In modeling/classification block 120, the speech signals can be processed further to adapt speaker-independent acoustic models to those of the current speaker if available. Finally, in search block 130, search algorithms can be used to guide the search engine to the most likely words corresponding to the speech signal. The search functionality of block 130 can be facilitated with the aid of acoustic models 140, lexical models 150, and language models 160.

Figure 2:
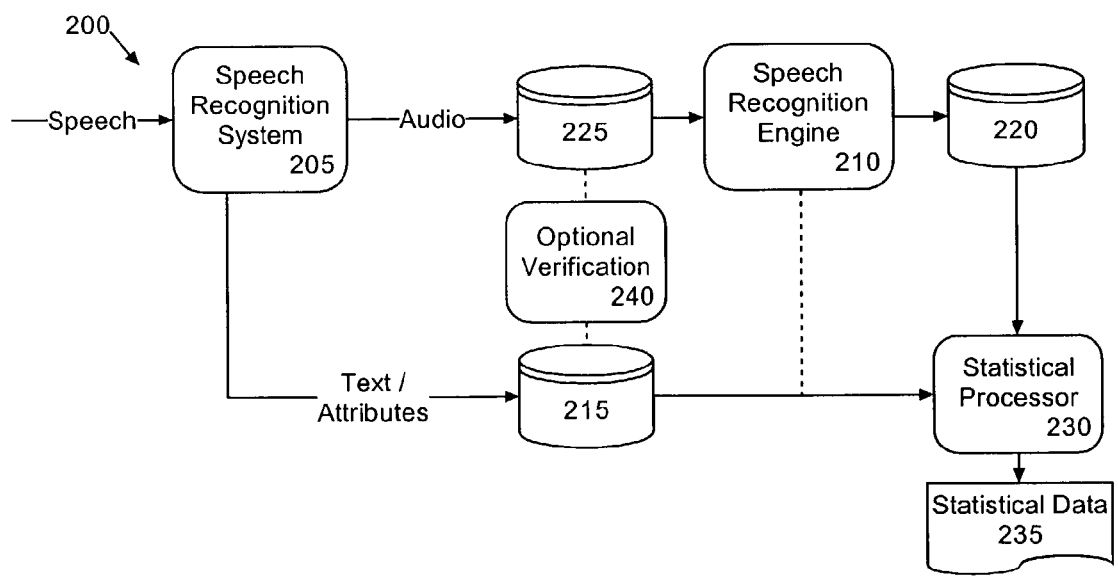
FIG. 2 is a schematic diagram illustrating a system for determining the accuracy of a speech recognition system in accordance with the inventive arrangements disclosed herein.

FIG. 2 is a schematic diagram illustrating a system 200 for determining the accuracy of a speech recognition system in accordance with the inventive arrangements disclosed herein. As shown in FIG. 2, the system 200 can include a speech recognition system 205 and a speech recognition engine 210. The speech recognition system 205 can be any of a variety of speech recognition systems such as a desktop system, a back-end processing system, for example the variety which typically executes within a speech server over a communications network, and/or an IVR system. Notably, the speech recognition system 205 can be any speech recognition system which is capable of generating a transaction log to be described herein in greater detail.

The speech recognition system 205 can be communicatively linked to a data store 215. The data store 215 can include a transaction log detailing the various speech recognition tasks and outputs of the speech recognition system 205. For example, as the speech recognition system 205 converts text to speech, the speech recognition system 205 can make entries within the data store 215. The entries can specify text recognition results as well as attributes describing the recognition results. For instance, the attributes can specify date and time information relating to when the user spoken utterance was received and/or recorded, and a telephone line and/or voice channel over which the user spoken utterance was received if implemented within a telephony speech recognition system. If the user is responding to a particular voice prompt, that information can be stored as well.

As the speech recognition system 205 performs each recognition task, any detected problems also can be noted within the entry. For example, in cases where the user spoke over a prompt the system can note the problem. The transaction log further can note whether the quality of the received audio was too poor for accurate recognition or whether any speech was detected during the user response period. The transaction log also can include information detailing the configuration of the speech recognition system 205. For example, any selected options, particular reference models such as acoustic or linguistic models or sound processing filters, any of which may changed to suit a particular audio environment, can be detailed within the transaction log.

As the speech recognition system 205 receives user spoken utterances, either the speech recognition system 205 itself, or another application program can store the audio segments within the audio data store 225. That is, audio segments or the actual user speech can be recorded and stored within the audio data store 225. For example, audio segments can be specified as a series of individual audio files. Accordingly, each audio segment can specify or be associated with information stored in the transaction log such that the entries in the transaction log can be correlated with corresponding audio segments. For example, according to one embodiment of the invention, audio files can be stored within a directory structure corresponding to date information. Alternatively, the name of an audio segment can be explicitly stored within the entries of the transaction log.

The speech recognition engine 210 can serve as a reference system which can be configured to function substantially similar to the speech recognition system 205. The speech recognition engine 210 can include configuration parameters which can be set to reflect the configuration parameters of the speech recognition system 205. For example, if the speech recognition system 205 is intended to be configured for use within a noisy audio environment and therefore employ particular acoustic models, threshold levels, and filtering, the speech recognition engine 210 also can be configured in a similar manner to provide an indication as to how the speech recognition system 205 is behaving. Still, the configuration and parameters of the speech recognition engine 210 can be altered to determine whether alternative configurations would provide better recognition results.

The speech recognition engine 210 can be communicatively linked to the audio data store 225 such that the speech recorded within the audio data store 225 can be made available to the speech recognition engine 210 for processing and recognition. The recognition results from the recognition engine 210 can be stored within a data store 220 to which the speech recognition engine 210 is communicatively linked. Accordingly, the data store 220 can include a transaction log for the speech recognition engine 210. The various attributes of the entries, however, can be determined from the audio segments themselves, or can be obtained by parsing the transaction log of the speech recognition system 205 and importing any such parameters. Hence, the speech recognition engine 210 is shown as having access to the data store 215, and thus the transaction log of the speech recognition system 205, via a dashed line. In any case, the recognition results and corresponding attributes can be used to correlate the recognition results of the speech recognition engine 210 with those of the speech recognition system 205 for comparison purposes.

The statistical processor 230 can access the data stores 215 and 220, and therefore the transaction logs of the speech recognition system 205 and the speech recognition engine 210. For example, the statistical processor can include any scripts necessary to parse the transaction log and extract the recognition results and various attributes. The statistical processor 230 can be configured to generate a variety of statistical metrics depicted by statistical data 235.

For example, the statistical data 235 can include the ratio of successful recognitions to the total number of recognitions, the number of successful recognitions to the total number of recognitions excluding the failed recognitions due to uncontrollable environmental elements, the ratio of failed recognitions to the total number of recognitions, the ratio of failed recognitions to the total number of recognitions minus the number of failed recognitions due to uncontrollable environmental elements, and the ratio of failed recognitions due to uncontrollable environmental elements to the total number of recognitions. The statistical processor 230 also can determine the number of attempted recognitions of unique words, the number of successful and unsuccessful recognitions of unique words, and the number of failed recognitions due to uncontrollable environmental elements.

Notably, the transaction log generated by the speech recognition system 205 can be edited through an optional and manual verification procedure referenced as item 240. In particular, the present invention allows test personnel to manually verify the recognition results of the speech recognition system 205 by listening to the audio segment. The test personnel can manually edit the transaction log to indicate whether the text result is an accurate representation of a corresponding audio segment. Moreover, the test personnel may enter a correct text result for particular audio segments after first listening to the segment. Thus, not only can the present invention generate statistical information from a comparison of a field speech recognition system to a reference system, the present invention further can measure the accuracy of both against a correct text recognition result as determined through a manual process.

FIG. 3 is a table 300 illustrating sample data which can be compiled by the system of FIG. 2 in accordance with the inventive arrangements disclosed herein. As shown in FIG. 3, the table includes a "Manual Listen" column indicating the text determined from manually listening to an audio segment to identify the words and/or phrases spoken by a user. The second column entitled "Application Voice Server 1" lists the recognition results as determined by a speech recognition system, for example, one that is operating in the field. The third column entitled "Result 1" indicates whether the text results listed under "Application Voice Server 1" are correct when compared with the manually verified text. The fourth column entitled "Application Voice Server 2" lists the recognized text as determined from a reference speech recognition engine, for example one operating within a controlled environment such as a lab. The fifth column entitled "Result 2" indicates whether the recognition results listed under "Application Voice Server 2" are correct when compared with the manually derived text.

Although not shown, the table can include additional information such as whether the recognition results listed under "Application Voice Server 1" are correct when compared with the recognition results listed under "Application Voice Server 2". Notably, the table 300 also specifies when no speech was detected as indicated in the "Application Voice Server 1" column by "[timeout]" and as indicated in the "Application Voice Server 2" column by "[]". For example, such can be the case where, as determined by the field speech recognition system, an audio signal includes too much noise for reliable recognition to occur. Other error conditions also can be noted such as where the user speaks over a voice prompt as indicated by "[spoke too soon]" and where only silence is detected as indicated by "[silence]".

FIG. 4 is a table 400 illustrating sample statistical metric calculations as determined in accordance with the inventive arrangements disclosed herein. As shown, the statistical information can include the total number of times a particular phrase was received, the number of times the phrase was correctly recognized, the number of times the phrase was recognized incorrectly, and a count specifying the number of times a result was not available or not applicable.

Figure 5:
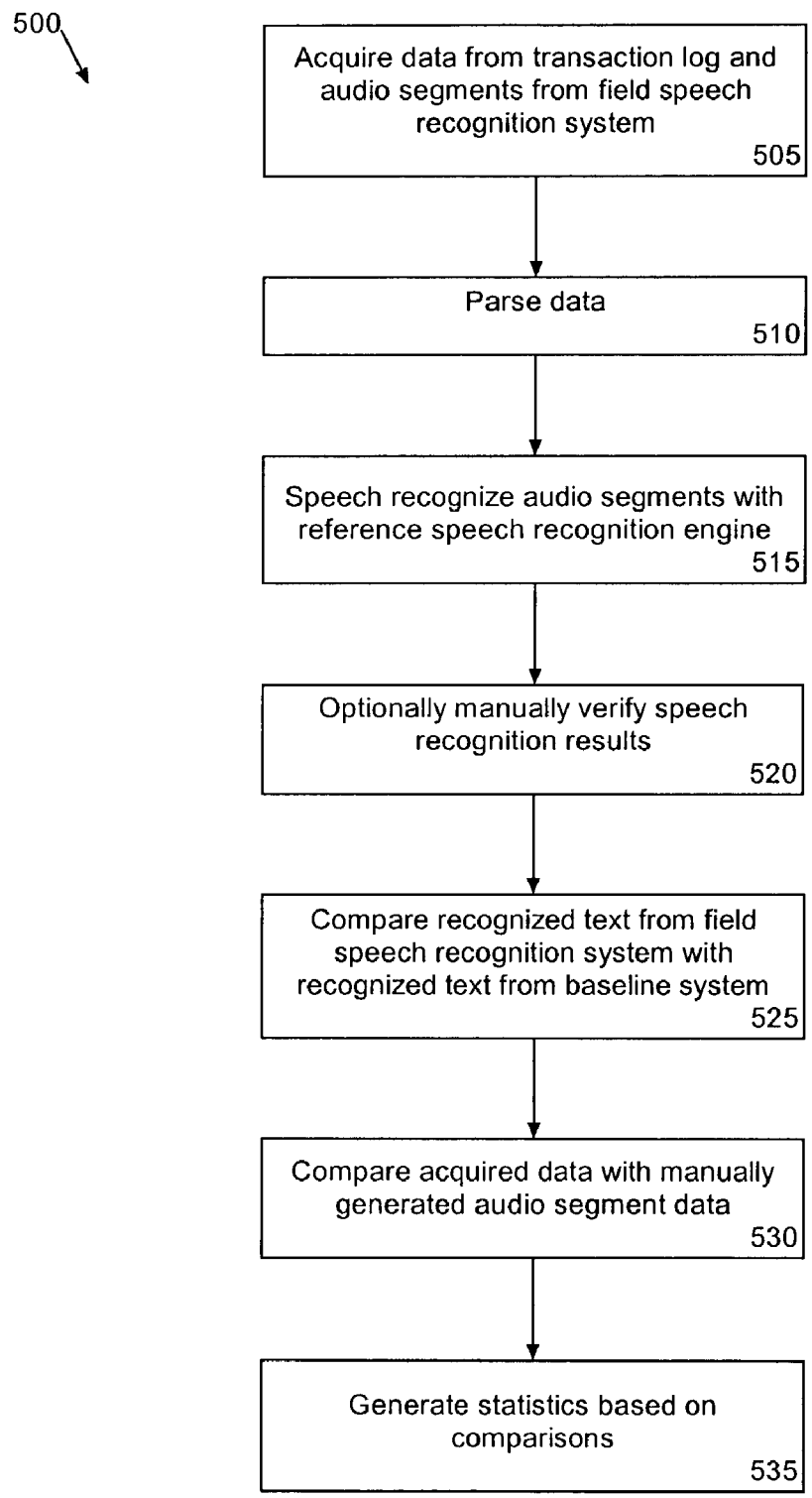
FIG. 5 is a flow chart illustrating an exemplary method for determining speech recognition accuracy statistics in accordance with the inventive arrangements disclosed herein.

FIG. 5 is a flow chart illustrating an exemplary method 500 for determining speech recognition accuracy statistics in accordance with the inventive arrangements disclosed herein. The method can begin in a state wherein a field speech recognition system has compiled a transaction log specifying text results and parameters such as date and time information and any other configuration parameters and failure conditions the speech recognition system is capable of logging. Audio segments for the various recognition results also can be stored.

In step 505, the data from the transaction log and audio segments can be accessed. In step 510, the transaction log can be parsed to extract the recognition results and attributes. For example, the transaction log can be parsed using one or more scripts which can extract information and convert the information to a usable format. The data can be formatted such that a user can more easily view and edit the information during a manual verification of the recognition results. Additionally, the data can be conditioned for comparison with recognition results as determined by the reference speech recognition engine. As mentioned, from the transaction log, information such as recognition results, date and time information for recognition results, audio segment information, as well as error conditions detected by the speech recognition system including excess noise in the audio segment (low signal-to-noise ratio) or the user speaking over prompts can be determined. Additionally, audio segments can be associated with corresponding transaction log entries.

In step 515, the audio segments can be provided as input to a reference speech recognition engine within a controlled computing and/or audio environment. The reference speech recognition engine can process the audio segments to determine recognized text from the audio segment inputs. In step 520, test personnel can manually verify the actual spoken words of the audio segments being analyzed. As mentioned, the test personnel can listen to the audio segments and transcribe the user spoken utterances. The manually transcribed text can be included with information extracted in step 510. Notably, during the manual verification process, the test personnel further can make note of additional details discernable from the audio recording.

For example, the test personnel can note conditions which the field speech recognition system may not be able to detect such as the particular audio environment in which the recording was made as well as any uncontrollable environmental factors such as excess noise which may be inherent within particular audio environments. For instance, tire noise when in an automobile or background noise as detected over public telephones is often not under control of the user. The test personnel can note ambient conditions such as weather related factors and other background noise sources. The test personnel can note whether the user was male or female or had a noticeable accent. Other factors such as whether the windows of an automobile were down as exemplified by excess wind noise and whether the user mis-spoke can be noted. This information can be specified as a code, for example, such that the statistical processing can reflect the impact of any noted factors determined through the manual transcription process.

In step 525, the recognized text as determined by the field speech recognition system can be compared to the recognized text as determined by the reference speech recognition engine. In step 530, the recognized text from both the field speech recognition system and the reference speech recognition engine can be compared to the manually derived text. Accordingly, in step 535, statistical metrics detailing the recognition performance of the speech recognition system can be determined.

Through an analysis of the statistical metrics, determinations can be made as to whether the field speech recognition system is properly configured for the audio environments from which the speech recognition system receives speech. As the reference speech recognition engine can be configured similar to, or the same as the field speech recognition system, determinations can be made as to whether recognition errors resulted from improper system configuration, uncontrollable environmental factors, or user error. Notably, the audio segments also can be processed to either insert and/or remove particular audio artifacts or audio characteristics for purposes of testing and comparison of the field speech recognition system and the reference speech recognition engine.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of determining the accuracy of a speech recognition system comprising:
   identifying from a log of said speech recognition system a text result and attributes associated with said text result, wherein said log comprises a plurality of log entries, each log entry correlated with a different electronically stored audio segment defining an audio representation corresponding to a portion of text for which a text result and at least one attribute is provided, and wherein each attribute characterizes at least one of a configuration of the speech recognition system, a type of audio channel over which an audio segment is received, and whether the audio segment is received in response to a user prompt;
   accessing an audio representation from which said text result was derived;
   processing said audio representation with a reference speech recognition engine to determine a second text result; and
   comparing said text result with said second text result to determine an accuracy of said speech recognition system.

2. The method of claim 1, further comprising:
   repeating each step of claim 1 for additional text results of said speech recognition system to determine an accuracy statistic of said speech recognition system.

3. The method of claim 2, further comprising:
   identifying at least one error condition specified in said log; and
   determining said accuracy statistic for said at least one of said identified error conditions.

4. The method of claim 2, wherein said attributes specify timing information for said text result, said accessing an audio representation step further comprising:
   identifying said audio representation from a plurality of audio representations according to said attributes of said text result.

5. The method of claim 2, further comprising:
manually determining text from said audio representation; and
comparing said first text result and said second text result with said manually determined text.

6. The method of claim 5, further comprising:
receiving audio properties of said audio representation.

7. The method of claim 6, further comprising:
adjusting the configuration of said reference speech recognition engine according to said audio properties of said audio representation.

8. The method of claim 6, further comprising:
altering acoustic models of said reference speech recognition engine according to said audio properties of said audio representation.

9. The method of claim 6, wherein said accuracy statistic is selected from the group consisting of a ratio of failed recognitions to total recognitions minus failed recognitions due to uncontrollable environmental elements, and a ratio of failed recognitions due to uncontrollable environmental elements to total recognitions.

10. The method of claim 6, wherein said accuracy statistic is selected from the group consisting of a total number of occurrences of unique words in which there was an attempt at recognition, a number of said occurrences of unique words which were successfully recognized, a number of said occurrences of unique words which were unsuccessfully recognized, and a number of failed attempts for said occurrences of unique words due to uncontrollable environmental elements.

11. The method of claim 2, wherein said accuracy statistic is selected from the group consisting of a ratio of the successful recognitions to total recognitions, a ratio of successful recognitions to total recognitions minus failed recognitions, and a ratio of failed recognitions to total recognitions.

12. A machine-readable storage, having stored thereon a computer program having a plurality of code sections executable by a machine for causing the machine to perform the steps of:
identifying from a log of said speech recognition system a text result and attributes associated with said text result, wherein said log comprises a plurality of log entries, each log entry correlated with a different electronically stored audio segment defining an audio representation corresponding to a portion of text for which a text result and at least one attribute is provided, and wherein each attribute characterizes at least one of a configuration of the speech recognition system, a type of audio channel over which an audio segment is received, and whether the audio segment is received in response to a user prompt;
accessing an audio representation from which said text result was derived;
processing said audio representation with a reference speech recognition engine to determine a second text result; and
comparing said text result with said second text result to determine an accuracy of said speech recognition system.

13. The machine-readable storage of claim 12, further comprising:
repeating each step of claim 12 for additional text results of said speech recognition system to determine an accuracy statistic of said speech recognition system.

14. The machine-readable storage of claim 13, further comprising:
identifying at least one error condition specified in said log; and
determining said accuracy statistic for said at least one of said identified error conditions.

15. The machine-readable storage of claim 13, wherein said attributes specify timing information for said text result, said accessing an audio representation step further comprising:
identifying said audio representation from a plurality of audio representations according to said attributes of said text result.

16. The machine-readable storage of claim 13, further comprising:
manually determining text from said audio representation; and
comparing said first text result and said second text result with said manually determined text.

17. The machine-readable storage of claim 16, further comprising:
receiving audio properties of said audio representation.

18. The machine-readable storage of claim 17, further comprising:
adjusting the configuration of said reference speech recognition engine according to said audio properties of said audio representation.

19. The machine-readable storage of claim 17, further comprising:
altering acoustic models of said reference speech recognition engine according to said audio properties of said audio representation.

20. The machine-readable storage of claim 17, wherein said accuracy statistic is selected from the group consisting of a ratio of failed recognitions to total recognitions minus failed recognitions due to uncontrollable environmental elements, and a ratio of failed recognitions due to uncontrollable environmental elements to total recognitions.

21. The machine-readable storage of claim 17, wherein said accuracy statistic is selected from the group consisting of a total number of occurrences of unique words in which there was an attempt at recognition, a number of said occurrences of unique words which were successfully recognized, a number of said occurrences of unique words which were unsuccessfully recognized, and a number of failed attempts for said occurrences of unique words due to uncontrollable environmental elements.

22. The machine-readable storage of claim 13, wherein said accuracy statistic is selected from the group consisting of a ratio of the successful recognitions to total recognitions, a ratio of successful recognitions to total recognitions minus failed recognitions, and a ratio of failed recognitions to total recognitions.

* * * * *